(12) United States Patent
Komiya et al.

(10) Patent No.: US 7,740,944 B2
(45) Date of Patent: Jun. 22, 2010

(54) MULTILAYER COATING

(75) Inventors: Zen Komiya, Tsukuba (JP); Masahito Mase, Tsukuba (JP); Junji Yoshizawa, Tsuchiura (JP); Takashi Ukachi, Ushiku (JP)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/469,132

(22) PCT Filed: Mar. 1, 2002

(86) PCT No.: PCT/NL02/00135

§ 371 (c)(1),
(2), (4) Date: Jan. 28, 2004

(87) PCT Pub. No.: WO02/070418

PCT Pub. Date: Sep. 12, 2002

(65) Prior Publication Data

US 2004/0115436 A1    Jun. 17, 2004

(30) Foreign Application Priority Data

Mar. 2, 2001    (JP) .............................. 2001-058402

(51) Int. Cl.
*B32B 27/40*    (2006.01)
*C08F 2/46*    (2006.01)

(52) U.S. Cl. ..................................... 428/423.3; 522/64

(58) Field of Classification Search ................. 428/412, 428/411.1, 423.1, 423.3; 522/64
See application file for complete search history.

(56) References Cited

U.S. PATENT DOCUMENTS

| | | | | | |
|---|---|---|---|---|---|
| 4,112,051 | A | * | 9/1978 | Sartori et al. | 423/223 |
| 5,402,516 | A | * | 3/1995 | Blyler et al. | 385/141 |
| 5,664,041 | A | * | 9/1997 | Szum | 385/128 |
| 5,876,493 | A | * | 3/1999 | Menovcik et al. | 106/445 |
| 6,114,090 | A | * | 9/2000 | Wu et al. | 430/281.1 |
| 6,136,880 | A | * | 10/2000 | Snowwhite et al. | 522/64 |
| 6,187,835 | B1 | * | 2/2001 | Szum et al. | 522/96 |
| 6,359,025 | B1 | * | 3/2002 | Snowwhite et al. | 522/64 |

FOREIGN PATENT DOCUMENTS

| | | |
|---|---|---|
| WO | 00 64831 | 11/2000 |
| WO | WO 0064831 A1 * | 11/2000 |

* cited by examiner

*Primary Examiner*—Thao T. Tran
(74) *Attorney, Agent, or Firm*—Nixon & Vanderhye P.C.

(57) ABSTRACT

The present invention relates to a multilayer coating in which a plurality of photocurable resin cured films are layered on a substrate, wherein at least two adjacent layers comprise the same hindered phenol-type antioxidant.

The multilayer coating can be applied onto a substrate, such as glass fibers, vinyl chloride sheets, polycarbonate sheets, glass plates, polyethylene films, wood, acrylic sheets, metal plates, and the like.

41 Claims, No Drawings

MULTILAYER COATING

CROSS REFERENCE TO RELATED APPLICATIONS

This application is the National Phase of International Application PCT/NL02/00135 filed Mar. 1, 2002, which designated the U.S. and which is hereby incorporated in its entirety by reference.

DETAILED DESCRIPTION OF THE INVENTION

1. Field of the Invention

The present invention relates to a multilayer coating on a substrate. More particularly, the present invention relates to a multilayer coating made of a photocurable resin containing a phenol-type antioxidant.

2. Description of Background Art

A coating using resin materials is a technique used for a wide variety of industrial products in order to provide various characteristics, such as stain resistance, scratch resistance, electrical insulation properties, reinforcement, weatherability, resistance to heat and cold, rust prevention properties, resistance to water and oil, antistaticity, coloration resistance, antireflection properties, and the like. Coating materials used for these purposes may have a multilayer structure consisting of two or more layers. For example, a flexible layer is applied to the surface of a substrate and a rigid layer having a comparatively high modulus of elasticity is applied over the flexible layer. In such a multilayer structure, an outer layer functions as a shell for shielding external force and an inner layer maintains flexibility. It is a common practice to apply a plurality of layers having different refractive indices in order to control reflectance from the viewpoint of control of the light reflection conditions.

A method of applying a coating material is commonly employed for forming a coating on the surface of the substrate. However, a long period of time is needed to cause the coating films to be dried and cured. A coating material made of a photocurable resin composition is capable of continuously forming a coating film for a very short period of time by appropriately selecting a photoinitiator added to the composition and other conditions, thereby exhibiting excellent characteristics in forming a coating at a higher speed. In view of long-term durability of coating layers, a coating used therefor must exhibit no or only a small change in the properties fro a period of time more than a use period for the products.

In many cases, industrial products provided with a multilayer coating are allowed to stand under fluorescent light for a long period of time during storage in a warehouse of the manufacturers or users or when the products are used. The coating on the industrial products provided with multilayer coating may exhibit yellowing under such conditions. It is considered that such yellowing is caused by coloration of antioxidants added to provide the coating with heat stability.

OBJECT OF THE INVENTION

An object of the present invention is to provide a multilayer coating which consists of a plurality of photocurable resin films layered on a substrate and exhibits no or only a small degree of yellowing when allowed to stand under fluorescent light for a long period of time.

SUMMARY OF THE INVENTION

The present invention provides a multilayer coating in which a plurality of photocurable resin cured films are layered on a substrate, wherein at least two adjacent layers contain the same hindered phenol-type antioxidant. Surprisingly, the multilayer coating of the present invention exhibits no or only a small change in color when exposed to fluorescent light, and therefore, excels in light resistance.

DETAILED DESCRIPTION OF THE INVENTION

A hindered phenol antioxidant used in the present invention a compound containing one to six hindered phenol groups having a structure in which alkyl groups are bonded to carbon atoms of phenol on both sides of the carbon atom to which a hydroxyl group is bonded. As examples of these alkyl groups, an alkyl group having 1-6 carbon atoms such as a methyl group, ethyl group, n-propyl group, i-propyl group, n-butyl group, i-butyl group, and tert-butyl group can be given. Two alkyl groups which make up the hindered phenol group may be the same or different. These alkyl groups are preferably selected from a methyl group and a tert-butyl group. These alkyl groups are still more preferably tert-butyl groups. A hindered phenol group having both a methyl group and a tert-butyl group (for example, organic group shown by formula (1)) is particularly preferable. As examples of the hindered phenol antioxidant, 2,2-thio-diethylenebis-[3-(3,5-di-tert-butyl-4-hydroxyphenyl)propionate] (IRGANOX 1035), benzenepropanoic acid-3,5-bis(1,1-dimethylethyl)-4-hydroxy,$C_7$-$C_9$ side chain alkyl ester (IRGANOX 1135), diethyl[{3,5-bis(1,1-dimethylethyl)4-hydroxyphenyl}methyl]phosphonate (IRGANOX 1222), hexa-tert-butyl-(mesitylene-2,4,6-triyl)tri-p-cresol (IRGANOX 1330), ethylenebis(oxyethylene)bis[3-(5-tert-butyl-4-hydroxy-m-tolyl)propionate] (IRGANOX 245), 1,3,5-tris(3,5-di-tert-butyl-4-hydroxybenzyl)-1,3,5-triazin-2,4,6(1H,3H,5H)-trione(IRGANOX 3114), 3,9-bis[2-{3-(3-tert-butyl-4-hydroxy-5-methylphenyl)propionyloxy}-1,1-dimethylethyl]-2,4,8,10-tetraoxaspiro[5.5]undecane (Sumilizer GA-80), triethylene glycol-bis[3-(3-tert-butyl-5-methyl-4-hydroxyphenyl)propionate], octadecyl 3-(3,5-di-tert-butyl-4-hydroxyphenyl)propionate (IRGANOX 1076, Sumilizer BP-76), pentaerythrityltetrakis[3-(5-di-tert-butyl-4-hydroxyphenyl)propionate] (IRGANOX 1010, Sumilizer BP-101), and the like can be given. Note that IRGANOX is a registered trademark of Ciba Specialty Chemicals Co., Ltd. and Sumilizer is a registered trademark of Sumitomo Chemical Industries Co., Ltd.

As the hindered phenol antioxidant used in the present invention, a phenol antioxidant having a hindered phenol group, said hindered phenol group containing none or only one sterically hindered alkyl group chosen from an i-propyl group, i-butyl group, and tert-butyl group is preferably, more preferably said hindered phenol group contains only one of said sterically hindered alkyl groups.

When the antioxidant contains more than 1 sterically hindered phenol group, it is preferred that each hindered phenol group contains none or only one group chosen from i-propyl group, i-butyl and tert-butyl group.

A particularly preferred phenol antioxidant is having a hindered phenol group shown b the following formula (1).

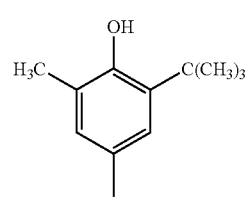

(1)

The hindered phenol antioxidant used in the present invention is particularly preferably a compound shown by the following formula (2) in which the hindered phenol groups shown by the formula (1) are bonded to both ends of a divalent organic group:

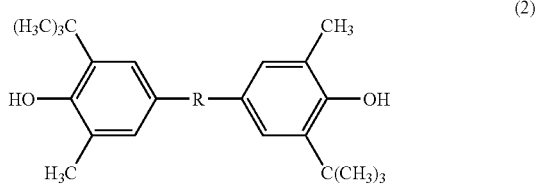

(2)

wherein the divalent organic group (—R—) consists of carbon atoms, hydrogen atoms, and oxygen atoms having a hydrocarbon chain having two or more carbon atoms and an ester structure.

As preferable examples of the above compound, 3,9-bis[2-{3-(3-tert-butyl-4-hydroxy-5-methylphenyl)propionyloxy}-1,1-dimethylethyl]-2,4,8,10-tetraoxaspiro[5.5]undecane (Sumilizer GA-80), triethylene glycol-bis[3-(3-tert-butyl-5-methyl-4-hydroxyphenyl)propionate], and 2,2-thio-diethylenebis[3-(3,5-di-tert-butyl-4-hydroxyphenyl)propionate] (Irganox 1035) can be given. Of these, 3,9-bis[2-{3-(3-tert-butyl-4-hydroxy-5-methylphenyl)propionyloxy}1,1-dimethylethyl]-2,4,8,10-tetraoxaspiro[5.5]undecane (Sumilizer GA-80) is particularly preferable.

According to a further embodiment, a hindered phenol having no tert-butyl groups, such as an organic group shown by formula (3), is preferred.

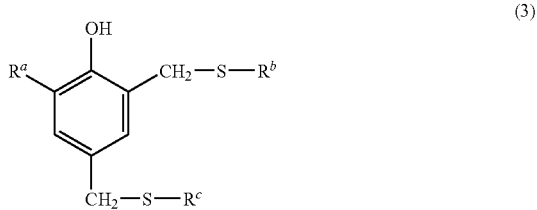

(3)

In formula (3), $R^a$, which is an alkyl group having 1-4 carbon atoms, is preferably a methyl group. $R^b$ and $R^c$ are preferably alkyl groups having 5-12, and more preferably 6-12 carbon atoms.

Further, 4,6-Bis(octylthiomethyl)-o-cresol, a compound shown by formula (3) provided that $R^b$ and $R^c$ are alkyl groups having eight carbon atoms, can be given and is commercially available as Irganox 1520, 1520 L, and 1520 LR.

The content of the hindered phenol antioxidant in a photocurable resin composition preferably from 0.01-4 wt %, preferably is 0.01-3%, preferably 0.03-1%, more preferably 0.05-0.7 wt. %, particularly preferably 0.1-0.4%, even more preferred 0.1-0.3 wt. %, and most preferred 0.15-0.2 wt % in view of heat stability and color stability under fluorescent light.

According to a particularly preferred embodiment of the present invention the same hindered phenol type antioxidant is present in each layer of the multilayer coating in an amount ranging from 0.1-0.4 wt %, more preferably ranging from 0.1-0.3 wt %, even more preferred ranging from 0.1-0.2 wt %.

These low amounts of the antioxidant of the present invention in each layer result in excellent light resistance under fluorescent light.

For example, the multilayer coating according to the present invention comprises a plurality of cured layers of photocurable resin compositions on a substrate, wherein at least the resin compositions of two adjacent layers comprise the same hindered phenol-type antioxidant.

For example, the multilayer coating is a two-layer coating.

There are no specific limitations to the photocurable resin composition for forming the multilayer coating of the present invention. The photocurable resin composition preferably contains a urethane (meth)acrylate, a monofunctional unsaturated polymerizable compound, a polyfunctional unsaturated polymerizable compound, and a photoinitiator as components.

A urethane (meth)acrylate can provide high-speed curability to the photocurable resin composition. Moreover, a urethane (meth)acrylate can provide the cured product of the composition with durability, toughness, and controlled flexibility.

A urethane (meth)acrylate is produced by reacting a polyol, a diisocyanate, and a (meth)acrylate containing a hydroxyl group. Specifically, a urethane (meth)acrylate is produced by reacting isocyanate groups of a diisocyanate respectively with a hydroxyl group of a polyol and a hydroxyl group of a (meth)acrylate containing a hydroxyl group.

As the reaction method, a method of reacting a polyol, diisocyanate, and (meth)acrylate containing a hydroxyl group altogether, a method of reacting a polyol with a diisocyanate, and reacting the resulting product with a (meth)acrylate containing a hydroxyl group, a method of reacting a diisocyanate and a (meth)acrylate containing a hydroxyl group, reacting the resulting product with a polyol, and reacting the resulting product with a (meth)acrylate containing a hydroxyl group, and the like can be given.

As examples of a polyol used for this reaction, polyether diols obtained by ring-opening polymerization of one ion-polymerizable cyclic compound such as polyethylene glycol, polypropylene glycol, polytetramethylene glycol, polyhexamethylene glycol, polyheptamethylene glycol, and polydecamethylene glycol, polyether diols obtained by ring-opening copolymerization of two or more ion-polymerizable cyclic compounds, and the like can be given.

As examples of ion-polymerizable cyclic compounds used as the raw material for synthesizing the above polyether diol, cyclic ethers such as ethylene oxide, propylene oxide, butene-1-oxide, isobutene oxide, oxetane, 3,3-dimethyloxetane, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyloxetane, vinyltetrahydrofuran, vinylcyclohexene oxide, phenyl glycidyl ether, butyl glycidyl ether, and glycidyl benzoate can be given.

Polyether diols obtained by the ring-opening copolymerization of these ion-polymerizable cyclic compounds and cyclic imines such as ethyleneimine, cyclic lactonic acids such as β-propyolactone and glycolic acid lactide, or dimethylcyclopolysiloxanes may be used. As specific examples of combinations of two or more ion-polymerizable cyclic compounds, combinations of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, butene-1-oxide and ethylene oxide, a ternary copolymer of tetrahydrofuran, butene-1-oxide, and ethylene oxide, and the like can be given. The ring-opening copolymer of these ion-polymerizable cyclic compounds may be either a random copolymer or a block copolymer.

As examples of commercially available products of these polyether diols, PTMG650, PTMG1000, PTMG2000 (manufactured by Mitsubishi Chemical Corp.), EXCENOL 1020, 2020, 3020, PREMINOL PML-4002, PML-5005 (manufactured by Asahi Glass Co., Ltd.), UNISAFE DC1100, DC1800, DCB1000 (manufactured by Nippon Oil and Fats Co., Ltd.), PPTG1000, PPTG2000, PPTG4000, PTG400, PTG650, PTG1000, PTG2000, PTG-L1000, PTG-L2000 (manufactured by Hodogaya Chemical Co., Ltd.), Z-3001-4, Z-3001-5, PBG2000 (manufactured by Daiichi Kogyo Seiyaku Co., Ltd.), ACCLAIM 2200, 2220, 3201, 3205, 4200, 4220, 8200, 12200 (manufactured by Lyondell), and the like can be given.

The above polyether diols are preferable used as the polyol. In addition, polyester diols, alkyd diols, polycarbonate diols, polycaprolactone diols, polyhydrocarbon diols, and the like may be used either individually or in combination with polyether diols. There are no specific limitations to the manner of polymerization of these structural units, which may be any of random polymerization, block polymerization, or graft polymerization.

As examples of polyester diols, polyester polyols obtained by reacting a polyhydric alcohol such as ethylene glycol, polyethylene glycol, propylene glycol, polypropylene glycol, tetramethylene glycol, polytetramethylene glycol, 1,6-hexanediol, neopentyl glycol, 1,4-cyclohexanedimethanol, 3-methyl-1,5-pentanediol, 1,9-nonanediol, and 2-methyl-1,8-octanediol with a polybasic acid such as phthalic acid, isophthalic acid, terephthalic acid, maleic acid, fumaric acid, adipic acid, and sebacic acid, and the like can be given. As commercially available products of polyester diols, Kurapol P-1010, P-2010, F-1010, F-2010, PMIPA-2000, PKA-A, PKA-A2, PNA-2000 (manufactured by Kuraray Co., Ltd.), and the like can be given.

As examples of polycarbonate diols, polycarbonate of polytetrahydrofuran, polycarbonate of 1,6-hexanediol, and the like can be given. As examples of commercially available products of polycarbonate diols, Nippolan 980, 981, 982, 983 (manufactured by Nippon Polyurethane Industry Co., Ltd.), Duracarb 120, 122, 124, 140, 142 (manufactured by PPG), PLACCEL CD 205, 208, 210, 220, 205PL, 208PL, 210PL, 220PL, 205HL, 208HL, 210OHL, 220HL (manufactured by Daicel Chemical Industries, Ltd.), and the like can be given.

As examples of polycaprolactone diols, polycaprolactone diols obtained by reacting ε-caprolactone and dihydric diols such as ethylene glycol, polyethylene glycol, propylene glycol, polypropylene glycol, tetramethylene glycol, polytetramethylene glycol, 1,2-polybutylene glycol, 1,6-hexanediol, neopentyl glycol, 1,4-cyclohexanedimethanol, and 1,4-butanediol can be given. These diols are commercially available as PLACCEL 205, L205AL, 212, L212AL, 220, L220AL (manufactured by Daicel Chemical Industries, Ltd.), and the like.

Diols other than those illustrated above may be used. As examples of other diols, ethylene glycol, propylene glycol, 1,4-butanediol, 1,5-pentanediol, 1,6-hexanediol, neopentyl glycol, 1,4-cyclohexanedimethanol, β-methyl-δ-valerolactone, hydroxy-terminal polybutadiene, hydroxy-terminated hydrogenated polybutadiene, castor oil-modified polyol, diol-terminated compound of polydimethylsiloxane, polydimethylsiloxanecarbitol-modified polyol, and the like can be given.

In addition to the above diols, diamines may be used in combination with the diols having a polyoxyalkylene structure. As examples of diamines, ethylenediamine, tetramethylenediamine, hexamethylenediamine, p-phenylenediamine, 4,4'-diaminodiphenylmethane, diamines containing a hetero atom, polyether diamines, and the like can be given.

The following compounds may be used as polyols having a cyclic structure. Examples include alkylene oxide addition diol of bisphenol A, alkylene oxide addition diol of bisphenol F, hydrogenated bisphenol A, hydrogenated bisphenol F, alkylene oxide addition diol of hydrogenated bisphenol A, alkylene oxide addition diol of hydrogenated bisphenol F, alkylene oxide addition diol of hydroquinone, alkylene oxide addition diol of naphthohydroquinone, alkylene oxide addition diol of anthrahydroquinone, 1,4-cyclohexane diol, and its alkylene oxide addition diol, tricyclodecane diol, tricyclodecanedimethanol, pentacyclopentadecane diol, pentacyclopentadecanedimethanol, and the like. Of these, alkylene oxide addition diol of bisphenol A and tricyclodecanedimethanol are preferable. These polyols are commercially available as Uniol DA400, DA700, DA1000, DB400 (manufactured by Nippon Oil and Fats Co., Ltd.), tricyclodecanedimethanol (manufactured by Mitsubishi Chemical Corp.), and the like.

The number average molecular weight of these diols is preferably 60-15,000, more preferably 100-8,000, even more preferred 200-6,000, and particularly preferably 300-4,000.

As examples of a diisocyanate used for producing a urethane (meth)acrylate used in the present invention, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylene bis(4-cyclohexyl isocyanate), 2,2,4-trimethylhexamethylene diisocyanate, bis(2-isocyanate ethyl)fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate, 2,5-bis(isocyanatemethyl)-bicyclo[2.2.1]heptane, 2,6-bis(isocyanatemethyl)-bicyclo[2.2.1]heptane, and the like can be given. Of these, 2,4-tolylene diisocyanate, isophorone diisocyanate, xylylene diisocyanate, and methylenebis(4-cyclohexylisocyanate) are preferable. Preferred among these are the wholly aliphatic diisocyanates.

As examples of a (meth)acrylate containing a hydroxyl group used for producing a urethane (meth)acrylate used in the present invention, 2-hydroxyethyl(meth)acrylate, 2-hydroxypropyl (meth)acrylate, 2-hydroxybutyl(meth)acrylate, 2-hydroxy-3-phenyloxypropyl(meth)acrylate, 1,4-butanediol mono(meth)acrylate, 2-hydroxyalkyl(meth)acryloyl phosphate, 4-hydroxycyclohexyl(meth)acrylate, 1,6-hexanediol mono(meth)acrylate, neopentyl glycol mono(meth)acrylate, trimethylolpropane di(meth)acrylate, trimethylolethane di(meth)acrylate, pentaerythritol tri(meth)acrylate, dipentaerythritol penta(meth)acrylate, and (meth)acrylates shown by the following formulas (4) and (5) can be given:

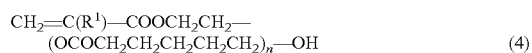

wherein $R^1$ represents a hydrogen atom or a methyl group and n is an integer from 1 to 15.

Compounds obtained by the addition reaction of a (meth) acrylic acid and a compound containing a glycidyl group such as alkyl glycidyl ether, allyl glycidyl ether, and glycidyl (meth)acrylate may be used. Of these (meth)acrylates containing a hydroxyl group, 2-hydroxyethyl (meth)acrylate and 2-hydroxypropyl (meth)acrylate are particularly preferable.

The proportion of the polyol, diisocyanate, and (meth) acrylate containing a hydroxyl group is determined so that isocyanate groups in the diisocyanate and a hydroxyl group in the (meth)acrylate containing a hydroxyl group are 1.1 to 3 equivalents and 0.2 to 1.5 equivalents respectively for one equivalent of hydroxyl groups in the polyol. It is preferable that the equivalent of hydroxyl groups in the polyol and acrylate be almost equal to the equivalent of isocyanate groups in the diisocyanate.

Part of a (meth)acrylate containing a hydroxyl group may be replaced by compounds having a functional group which can be added to an isocyanate group. For example, γ-mercaptotrimethoxysilane, γ-aminotrimethoxysilane, and the like can be used. Use of these compounds can improve adhesion to substrates such as glass.

A urethane (meth)acrylate used in the present invention can be synthesized by reacting the above polyol, diisocyanate, (meth)acrylate containing a hydroxyl group, and other optional components. In this reaction, a urethanization reaction proceeds in which isocyanate groups of a diisocyanate respectively react with a hydroxyl group of a polyol and a hydroxyl group of a (meth)acrylate containing a hydroxyl group.

In the reaction of these compounds, it is preferable to use a urethanization catalyst such as copper naphthenate, cobalt naphthenate, zinc naphthenate, di-n-butyltin dilaurate, triethylamine, 1,4-diazabicyclo[2.2.2]octane, or 2,6,7-trimethyl-1,4-diazabicyclo[2.2.2]octane in an amount from 0.01 to 1 part by weight for 100 parts by weight of the total reactant. The reaction is preferably carried out at 10-90° C., and more preferably at 30-80° C.

Further, examples of commercially available polyether-based urethane (meth)acrylate oligomers that can be suitably used are Echo Resins ALU-350 series resins, i.e., 350, 351, 352, 353 and 354, from Echo Resins and Laboratory, Versailles, Mo.; Purelast® oligomers including 566, 566A, 569, 569A, 586, 586A, 590, 590A, 595, 595A, 597A and 598A, Ebecryl® 8800, 270, 4826 oligomers from Radcure Specialties Inc., Louisville, Ky.; Uvithane® ZL-1178 oligomer from Morton, Thiokol Inc., Morton Chemical Division, Princeton, N.J.

The content of the urethane (meth)acrylate used in the photocurable resin composition preferably is 10-90 wt %, more preferably 15-80 wt. %. It is particularly preferable that the content of the urethane (meth)acrylate be 20-70%, more preferably 30-60 wt. %, to ensure applicability when applying the composition to a polymer sheet or optical fibers, and to ensure flexibility and long-term reliability of the cured coating material.

A urethane (meth)acrylate produced by reacting 1 mol of a diisocyanate with 2 mols of a (meth)acrylate compound containing a hydroxyl group may be added to the photocurable resin composition which produces the multilayer coating of the present invention. As examples of such a urethane (meth) acrylate, a reaction product of hydroxyethyl (meth)acrylate, 2,5-bis(isocyanatemethyl)-bicyclo[2.2.1]heptane, and 2,6-bis(isocyanatemethyl)-bicyclo[2.2.1]heptane, a reaction product of hydroxyethyl (meth)acrylate and 2,4-tolylene diisocyanate, a reaction product of hydroxyethyl (meth)acrylate and isophorone diisocyanate, a reaction product of hydroxypropyl (meth)acrylate and 2,4-tolylene diisocyanate, a reaction product of hydroxypropyl (meth)acrylate and isophorone diisocyanate, and the like can be given.

It is preferable to add monofunctional and polyfunctional unsaturated polymerizable compounds to the photocurable resin composition which produces the multilayer coating of the present invention.

As examples of monofunctional unsaturated polymerizable compounds, vinyl group-containing lactam such as N-vinylpyrrolidone and N-vinylcaprolactam, alicyclic structure-containing (meth)acrylates such as isobornyl (meth)acrylate, bornyl (meth)acrylate, tricyclodecanyl (meth)acrylate, dicyclopentanyl (meth)acrylate, dicyclopentenyl (meth)acrylate, and cyclohexyl (meth)acrylate, benzyl (meth)acrylate, 4-butylcyclohexyl (meth)acrylate, acryloylmorpholine, vinylimidazole, vinylpyridine, and the like can be given. Further examples include 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth) acrylate, isopropyl (meth)acrylate, butyl (meth)acrylate, amyl (meth)acrylate, isobutyl (meth)acrylate, t-butyl (meth) acrylate, pentyl (meth)acrylate, isoamyl (meth)acrylate, hexyl (meth)acrylate, heptyl (meth)acrylate, octyl (meth) acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol mono(meth)acrylate, polypropylene glycol mono(meth)acrylate, methoxyethylene glycol (meth) acrylate, ethoxyethyl (meth)acrylate, methoxypolyethylene glycol (meth)acrylate, methoxypolypropylene glycol (meth) acrylate, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether, a compound shown by the following formula (6), and the like:

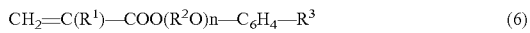

$$CH_2=C(R^1)-COO(R^2O)n-C_6H_4-R^3 \qquad (6)$$

wherein $R^1$ represents a hydrogen atom or a methyl group, $R^2$ represents an alkylene group having 2-6, and preferably 2-4 carbon atoms, $R^3$ represents a hydrogen atom or an alkyl group having 1-12, and preferably 1-9 carbon atoms. Preferred examples of the compound according to formula (6) are ethoxylated nonyl phenol acrylate and propoxylated nonyl phenol acrylate.

As examples of commercially available products of these compounds, Aronix M-101, M-102, M-111, M-113, M-114, M-117 (manufactured by Toagosei Co., Ltd.), Viscoat LA, STA, IBXA, 2-MTA, #192, #193 (manufactured by Osaka Organic Chemical Industry Co., Ltd.), NK Ester AMP-10G, AMP-20G, AMP-60G (manufactured by Shin-Nakamura Chemical Co., Ltd.), Light Acrylate L-A, S-A, IB-XA, PO-A, PO-200A, NP-4EA, NP-8EA (manufactured by Kyoeisha Chemical Co., Ltd.), FA-511, FA-512A, FA-513A (manufactured by Hitachi Chemical Co., Ltd.), and the like can be given.

As examples of polyfunctional unsaturated polymerizable compounds, trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, trimethylolpropanetrioxyethyl (meth)acrylate, tris(2-hydroxyethyl)isocyanurate tri(meth)acrylate, tris(2-hydroxyethyl)isocyanurate di(meth)acrylate, tricyclodecanedimethanol di(meth)acrylate, di(meth)acrylate of diol of an ethylene oxide or propylene oxide addition product of bisphenol A, di(meth)acrylate of diol of an ethylene oxide or propylene oxide addition product of hydrogenated bisphenol A, epoxy (meth)acrylate obtained by the addition of (meth)acrylate to diglycidyl ether of bisphenol A, triethylene glycol divinyl ether, and the like can be given.

As examples of commercially available products of these compounds, Yupimer UV SA1002, SA2007 (manufactured by Mitsubishi Chemical Corp.), Viscoat #195, #215, #230, #260, #700 (manufactured by Osaka Organic Chemical Industry, Ltd.), KAYARAD HDDA (manufactured by Nippon Kayaku Co., Ltd.), ARONIX M-210, M-215, M-315 (manufactured by Toagosei Co., Ltd.), and the like can be given. Of these, tricyclodecanedimethanol diacrylate (Yupimer UV SA1002) and Viscoat #230 and #700 are preferable.

The content of these unsaturated polymerizable compounds in the composition is preferably 10-90 wt. %, more preferably 15-80%, and particularly preferably 20-70%, and most preferred 30-60 wt. %. If the content is less than 10%, applicability of the composition decreases due to increased viscosity. Moreover, toughness of the cured product decreases and a cure shrinkage rate increases. If the content exceeds 90%, the cure speed decreases.

A photoinitiator is usually added to the photocurable resin composition used in the present invention. As examples of a photoinitiator, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl methyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyl diphenylphosphine oxide, bis-(2,6-dimethoxybenzoyl)-2,4,4-trimethylpentylphosphine oxide, and the like can be given.

As examples of commercially available products of a photoinitiator, Irgacure 184, 261, 369, 500, 651, 819, 907, 1700, 1850, 2959, CGI-403, Darocur 1173 (manufactured by Ciba Specialty Chemicals Co., Ltd.), Lucirin TPO (manufactured by BASF), and the like can be given. Of these, Irgacure 184, 369, 651, 907, 1700, 1800, 1850, and Lucirin TPO are preferable. Lucirin TPO is particularly preferable. Preferably, no Irganox 907 is present in the top coating.

The content of a photoinitiator in the photocurable resin composition is preferably 0.01-10%, more preferably 0.01-8 wt. %, even more preferred 0.05-5 wt. % and particularly preferably 0.1-4 wt. %.

In addition to the above components, other curable oligomers or polymers, reactive diluents, or other additives may be added to the photocurable resin composition used for the multilayer coating of the present invention insofar as the characteristics of the multilayer coating are not impaired.

As examples of other curable oligomers or polymers, polyester (meth)acrylate, epoxy (meth)acrylate, polyamide (meth)acrylate, a siloxane polymer having a (meth)acryloyloxy group, a reactive polymer obtained by reacting acrylic acid and a copolymer of glycidyl methacrylate and other vinyl monomers, and the like can be given.

Amine compounds may be added to the photocurable resin composition in order to prevent generation of hydrogen gas which causes transmission loss when the composition is applied to optical fibers. As examples of amine compounds, diethylamine, isopropylamine, dibutylamine, ethanolamine, diethanolamine, and the like can be given.

Other additives such as coloring agents, UV absorbers, light stabilizers, silane coupling agents, heat polymerization inhibitors, leveling agents, surfactants, preservatives, plasticizers, lubricants, solvents, fillers, wettability improvers, and coating surface improvers may be added in addition to the above components.

As examples of UV absorbers, benzophenone-type UV absorbers such as 2,4-dihydroxybenzophenone, 2-hydroxy4-methoxybenzophenone, and 2-hydroxy-4-n-dodecyloxybenzophenone, benzotriaole-type UV absorbers such as 2-(2'-hydroxy-5'-methylphenyl)benzotriaole and 2-(2'-hydroxy-5'-tert-octylphenyl)benzotriaole, commercially available products such as Tinuvin P, 234, 320, 326, 327, 328, 329, 213 (manufactured by Ciba Specialty Chemicals Co., Ltd.), Seesorb 101, 102, 103, 712, 704 (manufactured by Shipro Kasei Kaisha, Ltd.), Sumisorb 110, 130,140 (manufactured by Sumitomo Chemical Industries Co., Ltd.), and the like can be given.

Various suitable organofunctional silanes include but are not limited to amino-functional silanes, acrylamido-functional silanes, alkyl-functional silanes, vinyl-functional silanes, (meth)acrylate-functional silanes, and mercapto-functional silanes. The adhesion promotors are preferably methoxy-or ethoxy-substituted as well.

As examples of silane coupling agents, γ-aminopropyltriethoxysilane, γ-mercaptopropyltrimethoxysilane, and γ-(meth)acryloxypropyltrimethoxysilane, commercially available products such as SH6062, SH6030 (manufactured by Toray-Dow Corning Silicone Co. Ltd.), KBM 403, 503, 803, 903, 5103 (manufactured by Shin-Etsu Chemical Co., Ltd.), and the like can be given.

Polymers or oligomers such as epoxy resins, polyamide, polyamideimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resins, xylene resin, ketone resin, fluorine-containing oligomer, silicon-containing oligomer, and polysulfide-type oligomer may be added to the photocurable resin composition as other additives.

The photocurable resin composition used in the present invention is prepared by mixing the above components using a conventional method. The photocurable resin composition prepared in this manner is liquid. Viscosity of the photocurable resin composition is usually 200-20,000 mPa·s/25° C., and preferably 2,000-15,000 mPa·s/25° C. In the case where the photocurable resin composition of the present invention is used as a secondary material or a ribbon matrix material for optical fibers, the Young's modulus after curing is preferably 100-2,500 MPa, more preferably 300-2,000 MPa, even more preferred 500-1,500 MPa, and particularly preferred 800-1,200 MPa. When the composition is used as a primary material for optical fibers, the Young's modulus after curing is preferably 0.3-3 MPa, more preferably 0.5-2 MPa, even more preferably 0.7-1.5 MPa, particularly preferred 0.9-1.3 Mpa.

The photocurable resin composition used for the multilayer coating of the present invention is cured by light. Light used herein includes infrared rays, visible rays, ultraviolet rays, X-rays, electron beams, α-rays, β-rays, γ-rays, and the like. Of these, ultraviolet rays are preferable.

As a substrate to which the multilayer coating of the present invention is applied, glass fibers, vinyl chloride sheets, polycarbonate sheets, glass plates, polyethylene films, wood, acrylic sheets, metal plates, plastics (polycarbonate, polymethylmethacrylate, polystyrene, polyester, polyolefin, epoxy resins, melamine resins, triacetylcellulose resins, ABS resins, AS resins, norbornene resins etc.), paper, ceramics, and slates and the like can be given. Of these, glass fibers, glass plates, vinyl chloride sheets, polycarbonate sheets are preferable.

The multilayer coating of the present invention consists of at least a top or first coating layer and a second coating layer which is applied closer to the surface of the substrate than the first coating layer. The number of coating layers is preferably from two to five, and particularly preferably two.

The multilayer coating of the present invention is described below taking a case of an optical fiber as an example. The second coating layer is present on a core section and a cladding layer which covers the core section. The top (or first) coating layer is present over the second coating layer.

Such multilayer coating is formed by applying a second photocurable resin composition to a substrate, curing the second photocurable resin composition by ultraviolet irradiation, applying a first photocurable resin composition to the resulting cured product, and irradiating the first photocurable resin composition with ultraviolet rays. After applying the second photocurable resin composition to the substrate and the first photocurable resin composition to the second photocurable resin composition, the first photocurable resin composition and the second photocurable resin composition may be cured by ultraviolet irradiation at the same time.

The second coating layer which directly covers the cladding layer of the optical fiber functions as a stress buffer layer having a lower Young's modulus (said second layer typically is an optical fiber primary coating-type layer). The first (or top) coating layer subsequently present thereon functions as a protective layer for improving handling capability of the optical fiber having a higher Young's modulus (said first layer typically is an optical fiber secondary coating-type layer). Therefore, the above components are appropriately selected for the photocurable resin compositions which make up each coating layer so as to satisfy these properties. The thickness of the first coating layer is preferably about 1-200 μm. The thickness of the second coating layer is preferably about 1-200 μm.

Thus, the present invention further relates to a coated optical fiber comprising a glass fiber and a multilayer coating applied thereon, said multilayer coating comprising a primary coating and a secondary coating as adjacent layers, wherein the multilayer coating is a coating according to the present invention, and to an optical fiber ribbon according to claim 10.

A case of applying the multilayer coating to polycarbonate is illustrated below as another example. A photocurable resin composition exhibiting good adhesion to the surface of polycarbonate is used for the second coating layer. A coating layer formed of a photocurable resin composition which produces a cured product having high hardness is used for the first or top coating layer. Coating layers which are barely damaged due to high hardness and exhibit good adhesion to the substrate can be obtained by curing these photocurable resin compositions.

As examples of materials or substrates to which the multilayer coating of the present invention is applied, optical fiber ribbons, substrates (e.g.glass plate) for a liquid crystal panel, plastic lenses, polycarbonate sheets, vinyl chloride floor materials, wood materials for furniture, and the like can be given in addition to optical fibers, such as optical glass fibers and optical plastic fibers. The multilayer coating of the present invention can further be suitable used as a hard coating material for preventing stains or cracks (scratches), or as a reflection preventing coating material on the surface of various substrates like plastic optical parts such as a plastic lens, touch panels, film-type liquid crystal elements, display panels, like LCD, DPD and CRT, digital versatile discs, magneto optical discs, plastic containers, plastic windows or panes for example cars or buildings.

According to a particular embodiment of the present invention, the amount and type of the same hindered pheno antioxidant in primary and-secondary layer is chosen such that the yellowness index YI (as measured according to the evaluation method described further below) after storage of the multilayer coating under fluorescent light (illuminance 1200 Ix, FL20SSN/18 fluorescent lamp) at 23° C. and 50% RH for 4 days is less than about 8, more preferably less than about 7, even more preferred less than about 6. The difference in YI, ΔYI between the YI of multilayer coating after 4 days exposure to fluorescent light and the YI of the coating initially (before exposure to fluorescent light) is preferably less than about 5, more preferably less than about 4, even more preferably less than about 3 and particularly preferred less than about 2.

According to a further preferred embodiment of the present invention, the initial YI of the multilayer coating is less than about 2 and the ΔYI is less than about 5.

According to another preferred embodiment, YI initial is less than about 4, preferably about 3 or less and ΔYI is less than about 5, more preferably less than about 3, particularly preferable about 2 or less.

The present invention is described below in more detail by examples, which should not be construed as limiting the scope of the present invention.

EXAMPLES AND COMPARATIVE EXPERIMENTS

1. Photocurable Resin Composition which Makes Up Second Layer of Multilayer Coating (Layer Close to the Substrate)

1.1 Synthesis Example of Urethane Acrylate 1.1.1 Synthesis Example 1

Urethane Acrylate (UA-1)

A reaction vessel equipped with a stirrer was charged with 117.12 g of isophorone diisocyanate, 0.24 g of 2,6-di-tert-butyl-p-cresol, 0.08 g of phenothiazine, and 0.40 g of dibutyltin dilaurate. 37.08 g 2-hydroxyethyl acrylate was added dropwise to the mixture at 30° C. or lower. After the addition, the mixture was allowed to react at 30° C. for 40 minutes. The mixture was heated to 45° C. and allowed to react for one hour. 844.68 g of ring-opening copolymer diol of ethylene oxide and butylene oxide (weight ratio: 25/75) with a number average molecular weight of 2,300 and 0.40 g of dibutyltin dilaurate were added to the mixture. The mixture was allowed to react at 50° C. for one hour. The mixture was heated to 70° C. and allowed to react. The reaction was terminated when the residual isocyanate concentration was 0.05 wt % or less to obtain urethane acrylate (this urethane acrylate is referred to as "UA-1").

1.1.2 Synthesis Example 2

Urethane Acrylate (UA-2)

A reaction vessel equipped with a stirrer was charged with 898.07 g of polypropylene glycol with a number average molecular weight of 4000 ("ACCLAIM 4200" manufactured by Bayer), 74.76 g of isophorone diisocyanate, 0.24 g of 2,6-di-tert-butyl-p-cresol, and 0.08 g of phenothiazine. The mixture was cooled to 15° C. while stirring. After the addition of 0.80 g of dibutyltin dilaurate, the mixture was slowly heated to 35° C. for one hour while stirring. The mixture was heated to 50° C. and allowed to react. After the residual isocyanate concentration decreased to 0.97 wt % or less of the total amount of the reactants, 26.04 g of 2-hydroxyethyl acrylate was added. The mixture was allowed to react at about 60° C. while stirring. The reaction was terminated when the residual isocyanate concentration was 0.1 wt % or less to obtain urethane acrylate (this urethane acrylate is referred to as "UA-2").

1.2 Preparation of Photocurable Resin Composition

1.2.1 Composition Example 1

(p-1)

A reaction vessel equipped with a stirrer was charged with 65 parts by weight of the urethane acrylate UA-1 obtained in Synthesis Example 1, 26 parts by weight of nonylphenol EO-modified acrylate ("Aronix M-113" manufactured by Toagosei Co., Ltd.), 8 parts by weight of N-vinylcaprolactam (manufactured by ISP Japan, Ltd.), 1 part by weight of 1,6-hexanediol diacrylate ("Viscoat #230" manufactured by Osaka Organic Chemical Industry, Ltd.), and 1.2 parts by weight of 2,4,6-trimethylbenzoyldiphenylphosphine oxide ("Lucirin TPO" manufactured by BASF). The mixture was stirred at 50° C. to prepare a homogeneous solution. Then, 0.1 part by weight of diethylamine and 1.0 part by weight of γ-mercaptopropyltrimethoxysilane ("SH6062" manufactured by Toray-Dow Corning Silicone Co., Ltd.) were added to the mixture. 0.3 part by weight of 3,9-bis[2-{3-(3-tert-butyl-4-hydroxy-5-methylphenyl)propionyloxy}-1,1-dimethylethyl]-2,4,8,10-tetraoxaspiro[5.5]undecane ("Sumilizer GA-80" manufactured by Sumitomo Chemical Industries Co., Ltd.) was added to the mixture as a phenol-type antioxidant to prepare a photocurable resin composition (p-1).

1.2.2 Composition Example 2

(p-2)

A reaction vessel equipped with a stirrer was charged with 63 parts by weight of the urethane acrylate UA-2 obtained in Synthesis Example 1, 12 parts by weight of nonylphenol EO-modified acrylate ("Aronix M-113" manufactured by Toagosei Co., Ltd.), 8 parts by weight of N-vinylcaprolactam (manufactured by ISP Japan, Ltd.), 15 parts by weight of isobornyl acrylate ("IBXA" manufactured by Osaka Organic Chemical Industry Co., Ltd.), 2 parts by weight of 1,6-hexanediol diacrylate ("Viscoat #230" manufactured by Osaka Organic Chemical Industry, Ltd.), 1.2 parts by weight of 2,4,6-trimethylbenzoyldiphenylphosphine oxide ("Lucirin TPO" manufactured by BASF), and 0.15 part by weight of 2-hydroxy4-methoxybenzophenone ("Seesorb 101" manufactured by Shipro Kasei Kaisha, Ltd.). The mixture was stirred at 50° C. to prepare a homogeneous solution. Then, 0.1 part by weight of diethylamine and 1.0 part by weight of γ-mercaptopropyltrimethoxysilane were added to the mixture. 0.3 part by weight of 3,9-bis[2-{3-(3-tert-butyl-4-hydroxy-5-methylphenyl)propionyloxy}-1,1-dimethylethyl]-2,4,8,10-tetraoxaspiro[5.5]undecane ("Sumilizer GA-80" manufactured by Sumitomo Chemical Industries Co., Ltd.) was added to the mixture as a phenol-type antioxidant to prepare a photocurable resin composition (p-2).

1.2.3 Composition Example 3

(p-a)

A photocurable composition (p-a) was prepared in the same manner as in Composition Example 1 except for using 2,2-thio-diethylenebis-[3-(3,5-di-tert-butyl-4-hydroxyphenyl)propionate] ("Irganox 1035" manufactured by Ciba Specialty Chemicals Co., Ltd.) instead of the phenol-type antioxidant used in the preparation of the photocurable resin composition (p-1) in Composition Example 1.

1.2.4 Composition Example 4

(p-b)

A photocurable composition (p-b) was prepared in the same manner as in Composition Example 2 except for using 2,2-thio-diethylenebis-[3-(3,5-di-tert-butyl-4-hydroxyphenyl)propionate] ("Irganox 1035" manufactured by Ciba Specialty Chemicals Co., Ltd.) instead of the phenol-type antioxidant used in the preparation of the photocurable resin composition (p-2) in Composition Example 2.

2. Photocurable Resin Composition which Makes Up First (or Top) layer of Multilayer Coating (Layer Closest to the Fluorescent Lamp)

2.1 Synthesis of Urethane Acrylate

2.1.1 Synthesis Example 3

Urethane Acrylate (UA-3)

A reaction vessel equipped with a stirrer was charged with 14.5 wt % of tolylene diisocyanate, 11.3 wt % of tricyclodecanedimethanol diacrylate ("SA1002" manufactured by Mitsubishi Chemical Corp.), 0.04 wt % of di-n-butyltin dilaurate, and 0.02 wt % of 2,6-di-tert-butyl-p-cresol. The mixture was cooled to 5-10° C. 12.7 wt % of 2-hydroxyeth acrylate was added dropwise at 10° C. or less while stirring. After the addition, the mixture was allowed to react at 30° C. for one hour. After the addition of 7.0 wt % of ethylene oxide addition (1 mol) diol of bisphenol A ("DA400" manufactured by Nippon Oil and Fats Co., Ltd.) and 22.5 wt % of polytetramethylene glycol with a number average molecular weight of 2,000, the mixture was allowed to react at 50-70° C. for two hours. The reaction was terminated when the residual isocyanate concentration was 0.1 wt % or less. Urethane acrylate thus obtained is referred to as (UA-3).

2.1.2 Synthesis Example 4

Urethane Acrylate (UA4)

A reaction vessel equipped with a stirrer was charged with 18.4 wt % of tolylene diisocyanate, 10.9 wt % of isobornyl acrylate ("IBOA" manufactured by Osaka Organic Chemical Industry Co., Ltd.), 0.05 wt % of di-n-butyltin dilaurate, and 0.02 wt % of 2,6-di-tert-butyl-p-cresol. The mixture was cooled to 5-10° C. 17.4 wt % of 2-hydroxyethyl acrylate was added dropwise at 10° C. or less while stirring. After the addition, the mixture was allowed to react at 30° C. for one hour. 30.6 wt % polytetramethylene glycol with a number average molecular weight of 1,000 was added to the mixture. The mixture was allowed to react at 50-70° C. for two hours. The reaction was terminated when the residual isocyanate concentration was 0.1 wt % or less. Urethane acrylate thus obtained is referred to as (UA4).

2.2 Preparation of Photocurable Resin Composition 2.2.1 Composition Example 5

(s-1)

67 wt % of (UA-3), 4.9 wt % of tricyclodecanedimethanol diacrylate ("SA1002" manufactured by Mitsubishi Chemical Corp.), 8.9 wt % of N-vinylpyrrolidone (manufactured by ISP Japan, Ltd.), 7.7 wt % of isobornyl acrylate ("IBOA" manufactured by Osaka Organic Chemical Industry Co., Ltd.), 7.0 wt % of diacrylate of ethylene oxide addition (1 mol) diol of bisphenol A ("Viscoat 700" manufactured by Osaka Organic Chemical Industry Co., Ltd.), 1.5 wt % of Lucirin TPO (manufactured by BASF), 3.0 wt % of 3,9-bis[2-{3-(3-tert-butyl-4-hydroxy-5-methylphenyl)propionyloxy}-1,1-dimethylethyl]-2,4,8,10-tetraoxaspiro[5.5]undecane ("Sumilizer GA-80" manufactured by Sumitomo Chemical Industries Co., Ltd.) were stirred until a homogenous solution was obtained to prepare a photocurable resin composition (s-1).

2.2.2 Composition Example 6

(s-2)

4.8 wt % of N-vinylpyrrolidone (manufactured by ISP Japan, Ltd.), 14.7 wt % of trimethylolpropane triacrylate ("Viscoat 295" manufactured by Osaka Organic Chemical Industry Co., Ltd.), 1.5 wt % of Lucirin TPO (manufactured by BASF), and 3.0 wt % of 3,9-bis[2-{3-(3-tert-butyl-4-hydroxy-5-methylphenyl)propionyloxy}1,1-dimethylethyl]-2,4,8,10-tetraoxaspiro[5.5]undecane ("Sumilizer GA-80" manufactured by Sumitomo Chemical Industries Co., Ltd.) were added to 76 wt % of (UA4) at 70° C. while stirring. The mixture was stirred until a homogenous solution was obtained to prepare a photocurable resin composition (s-2).

2.2.3 Composition Example 7

(s-a)

A photocurable composition (s-a) was obtained in the same manner as in Composition Example 5 except for using 2,2-thio-diethylenebis-[3-(3,5-di-tert-butyl-4-hydroxyphenyl)propionate] ("IRGANOX 1035" manufactured by Ciba Specialty Chemicals Co., Ltd.) instead of the phenol-type antioxidant used in the preparation of (s-1) in Composition Example 5.

2.2.4 Composition Example 8

(s-b)

A photocurable composition (s-b) was obtained in the same manner as in Composition Example 6 except for using 2,2-thio-diethylenebis-[3-(3,5-di-tert-butyl-4-hydroxyphenyl)propionate] ("IRGANOX 1035" manufactured by Ciba Specialty Chemicals Co., Ltd.) instead of the phenol-type antioxidant used in the preparation of (s-2) in Composition Example 6.

Example 1

The photocurable resin composition (p-1) for the second layer was applied to a slide using an applicator for a thickness of 254 μm. The photocurable resin composition was exposed to ultraviolet rays using a 3.5 kW metal halide lamp ("SMX-3500/F-OS" manufactured by ORC Co., Ltd.) at a dose of 0.1 J/cm$^2$ in a nitrogen atmosphere to obtain a cured film with a thickness of about 130 μm. The photocurable resin composition (s-1) for the first (or top) layer was applied to the cured film using an applicator for a thickness of 254 μm. The photocurable resin composition was exposed to ultraviolet rays using a 3.5 kW metal halide lamp ("SMX-3500/F-OS" manufactured by ORC Co., Ltd.) at a dose of 0.1 J/cm$^2$ in a nitrogen atmosphere to obtain a cured film with a thickness of about 130 μm. A two-layer coating with a thickness of about 260 μm consisting of the top layer and the second layer was thus obtained.

Examples 2-8 and Comparative Experiments 1-8

A two-layer coating with a thickness of about 260 μm was obtained by changing the combination of the photocurable resin composition for the second layer and the photocurable resin composition for the top layer as shown in Tables 1 and 2 under the same conditions as in Example 1.

Test Method Section

Evaluation Method

The two-layer coating placed on the slide was exposed to fluorescent light at a temperature of 23° C. and a relative humidity of 50% RH. "FL20SSN/18" (manufactured by Toshiba Corporation) was used as a fluorescent lamp 18W (100V). Illuminance at the surface of the cured film was 1200 lx. The distance between the two-layer coating sample and the lamp is 30 cm. The degree of yellowing of the cured coating before irradiation of fluorescent light and after irradiation for a specific period of time was evaluated using a colorimeter ("SZ-Σ80 spectrophotometer" manufactured by Nippon Denshoku Industries Co., Ltd.) based on YI (yellowness index). The smaller the YI value, the smaller the degree of yellowing.

The evaluation results for Examples and Comparative Experiments are respectively shown in Tables 1 and 2. The abbreviations for the photocurable resin compositions of Examples and Comparative Experiments and the names of antioxidants contained therein are listed in Table 3.

TABLE 1

(Yellowing of multilayer coating under fluorescent light)

| Example | Top layer | Secondlayer | Initial YI value | YI value under fluorescent light after 4 days | ΔYI |
|---|---|---|---|---|---|
| 1 | s-1 | p-1 | 2 | 3 | 1 |
| 2 | s-1 | p-2 | 2 | 4 | 2 |
| 3 | s-2 | p-1 | 1 | 2 | 1 |
| 4 | s-2 | p-2 | 2 | 3 | 1 |
| 5 | s-a | p-a | 3 | 5 | 2 |

TABLE 1-continued (Yellowing of multilayer coating under fluorescent light)

| Example | Top layer | Secondlayer | Initial YI value | YI value under fluorescent light after 4 days | ΔYI |
|---|---|---|---|---|---|
| 6 | s-a | p-b | 3 | 5 | 2 |
| 7 | s-b | p-a | 2 | 4 | 2 |
| 8 | s-b | p-b | 3 | 5 | 2 |

TABLE 2

(Yellowing of multilayer coating under fluorescent light)

| Comparative Experiment | Top layer | Secondlayer | Initial YI value | YI value under fluorescent light after 4 days | ΔYI |
|---|---|---|---|---|---|
| 1 | s-1 | p-a | 2 | 14 | 12 |
| 2 | s-1 | p-b | 2 | 10 | 8 |
| 3 | s-2 | p-a | 2 | 12 | 10 |
| 4 | s-2 | p-b | 2 | 10 | 8 |
| 5 | s-a | p-1 | 2 | 8 | 6 |
| 6 | s-a | p-2 | 1 | 9 | 8 |
| 7 | s-b | p-1 | 3 | 8 | 5 |
| 8 | s-b | p-2 | 2 | 9 | 7 |

TABLE 3

(Antioxidant)

| Coating | Antioxidant |
|---|---|
| s-1 | 3,9-Bis[2-{3-(3-tert-butyl-4-hydroxy-5-methyl-phenyl)propionyloxy}-1,1-dimethylethyl]-2,4,8,10-tetraoxaspiro[5.5]undecane (Sumilizer GA-80) |
| s-2 | |
| p-1 | |
| p-2 | |
| s-a | 2,2-Thio-diethylenebis[3-(3,5-di-tert-butyl-4-hydroxyphenyl)propionate] (Irganox 1035) |
| s-b | |
| p-a | |
| p-b | |

Evaluation Results

As is clear from the results for Examples 1-8 in Table 1, the multilayer coating in which an antioxidant having a hindered phenol group having the same structure were contained in the first and second coating layers exhibited a low YI value of 2-5 after allowed to stand under fluorescent light for four days. The ΔYI values are also low, namely between 1-2. The multilayer coating containing an antioxidant having a 3-tert-butyl-4-hydroxy-5-methylphenyl group, which is a preferred embodiment of the present invention, exhibited a low YI value of 2-4. On the contrary, as shown in Table 2 showing the results for Comparative Experiments 1-8, the multilayer coating in which the first coating layer and the second coating layer contained antioxidants having hindered phenol groups having different structures exhibited a high YI value of 8-14 after allowed to stand under fluorescent light for four days. The YI-values are also high, namely between 5-12.

The invention claimed is:

1. A multilayer coating in which a plurality of photocurable resin cured films are layered, wherein at least two adjacent layers comprise the same hindered phenol antioxidant in different amounts, and wherein the antioxidant has at least one hindered phenol group, said hindered phenol group containing none or only one sterically hindered alkyl group selected from the group consisting of an i-propyl group, an i-butyl group, and a tert-butyl group and wherein said adjacent layers comprise urethane meth(acrylate), wherein said multilayer coating further comprises an amine compound;

wherein said amine compound is present in said multilayer coating to prevent the generation of hydrogen gas.

2. The multilayer coating according to claim 1, wherein the antioxidant is present in the at least two layers in amounts ranging from 0.01 to 4 wt %.

3. The multilayer coating according to claim 2, wherein the amounts range from 0.01 to 3 wt %.

4. The multilayer coating according to claim 1, wherein the at least one hindered phenol group contains only one sterically hindered alkyl group selected from the group consisting of an i-propyl group, an i-butyl group, and a tert-butyl group.

5. The multilayer coating according to claim 1, wherein the antioxidant is a compound having a group shown by the following formula (1)

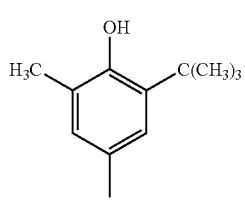

(1)

6. The multilayer coating according to claim 1, wherein the antioxidant is a compound shown by the following formula (2):

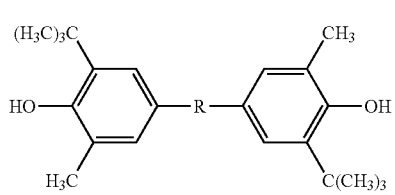

(2)

wherein R represents a divalent organic group consisting of carbon atoms, hydrogen atoms, and oxygen atoms containing a hydrocarbon chain having two or more carbon atoms and an ester structure.

7. The multilayer coating according to claim 1, wherein the coating exhibits a YI of less than 7 after 4 days of fluorescent light exposure at 23° C. and 50% RH.

8. The multilayer coating according to claim 1, wherein the coating exhibits a ΔYI, the difference in YI due to 4 days exposure of the coating at 23° C. and 50% RH by fluorescent light, of less than 3.

9. A substrate coated with the multilayer coating according to claim 1, said substrate being selected from the group consisting of an optical glass fiber, optical plastic fiber, optical fiber ribbon, glass plate for a liquid crystal panel, plastic lens, a polycarbonate sheet, vinyl chloride floor material, and wood material for furniture.

10. A coated optical fiber comprising a glass fiber and a multilayer coating applied thereon, said multilayer coating comprising a primary coating and a secondary coating as adjacent layers, wherein the multilayer coating is a coating according to claim 1.

11. An optical fiber ribbon comprising at least two coated optical fibers according to claim 10 and a matrix material in which the optical fibers are encapsulated.

12. The multilayer coating according to claim 6, wherein the antioxidant is 3,9-bis[2-{3-(3-tert-butyl-4-hydroxy-5-methylphenyl)propionyloxy}-1,1-dimethylethyl]-2,4,8,10-tetraoxaspiro[5.5]undecane or triethylene glycol-bis[3-(3-tert-butyl-5-methyl-4-hydroxyphenyl)propionate].

13. The multilayer coating according to claim 12, wherein the antioxidant is present in the at least two layers in amounts ranging from 0.01 to 4 wt %.

14. The multilayer coating according to claim 12, wherein said coating exhibits a YI of less than 7 after 4 days of fluorescent light exposure at 23° C. and 50% RH.

15. The multilayer coating according to claim 12, wherein said coating exhibits a ΔYI of less than 3 after 4 days of fluorescent light exposure at 23° C. and 50% RH.

16. The multilayer coating according to claim 1, wherein said hindered phenol group contains no tert-butyl group.

17. The multilayer coating according to claim 16, wherein said antioxidant has the following formula:

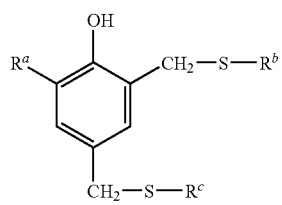

wherein $R^a$ is an alkyl group having 1-4 carbon atoms, and $R^b$ and $R^c$ are alkyl groups having 5-12 carbon atoms.

18. The multilayer coating according to claim 17, wherein said coating exhibits a YI of less than 7 after 4 days of fluorescent light exposure at 23° C. and 50% RH.

19. The multilayer coating according to claim 17, wherein said coating exhibits a ΔYI of less than 3 after 4 days of fluorescent light exposure at 23° C. and 50% RH.

20. The multilayer coating according to claim 17, wherein said antioxidant is 4,6-bis(octylthiomethyl)-o-cresol.

21. A multilayer coating in which a plurality of photocurable resin cured films are layered, wherein at least two adjacent layers comprise the same hindered phenol antioxidant in different amounts, and wherein the antioxidant has at least one hindered phenol group, said hindered phenol group containing none or only one sterically hindered alkyl group selected from the group consisting of an i-propyl group, an i-butyl group, and a tert-butyl group and wherein said adjacent layers comprise urethane meth(acrylate), wherein the antioxidant is present in the at least two layers in amounts ranging from 0.01 to 4 wt %, and wherein said multilayer coating comprises an amine compound;

wherein said amine compound is present in said multilayer coating to prevent the generation of hydrogen gas.

22. The multilayer coating according to claim 21, wherein the amounts range from 0.01 to 3 wt %.

23. The multilayer coating according to claim 21, wherein the at least one hindered phenol group contains only one sterically hindered alkyl group selected from the group consisting of an i-propyl group, an i-butyl group, and a tert-butyl group.

24. The multilayer coating according to claim 21, wherein the antioxidant is a compound having a group shown by the following formula (1)

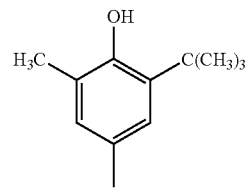

25. The multilayer coating according to claim 21, wherein the antioxidant is a compound shown by the following formula (2):

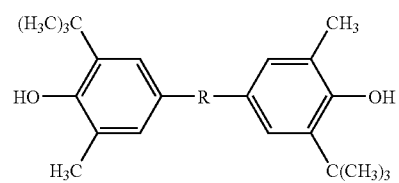

wherein R represents a divalent organic group consisting of carbon atoms, hydrogen atoms, and oxygen atoms containing a hydrocarbon chain having two or more carbon atoms and an ester structure.

26. The multilayer coating according to claim 21, wherein the coating exhibits a YI of less than 7 after 4 days of fluorescent light exposure at 23° C. and 50% RH.

27. The multilayer coating according to claim 21, wherein the coating exhibits a ΔYI, the difference in YI due to 4 days exposure of the coating at 23° C. and 50% RH by fluorescent light, of less than 3.

28. A substrate coated with the multilayer coating according to claim 21, said substrate being selected from the group consisting of an optical glass fiber, optical plastic fiber, optical fiber ribbon, glass plate for a liquid crystal panel, plastic lens, a polycarbonate sheet, vinyl chloride floor material, and wood material for furniture.

29. A coated optical fiber comprising a glass fiber and a multilayer coating applied thereon, said multilayer coating comprising a primary coating and a secondary coating as adjacent layers, wherein the multilayer coating is a coating according to claim 21.

30. An optical fiber ribbon comprising at least two coated optical fibers according to claim 29 and a matrix material in which the optical fibers are encapsulated.

31. The multilayer coating according to claim 25, wherein the antioxidant is 3,9-bis[2- {3-(3-tert-butyl-4-hydroxy-5-methylphenyl)propionyloxy}-1,1-dimethylethyl]-2,4,8,10-tetraoxaspiro[5.5]undecane or triethylene glycol-bis[3-(3-tert-butyl-5-methyl-4-hydroxyphenyl)propionate].

32. The multilayer coating according to claim 31, wherein the antioxidant is present in the at least two layers in amounts ranging from 0.01 to 4 wt %.

33. The multilayer coating according to claim 31, wherein said coating exhibits a YI of less than 7 after 4 days of fluorescent light exposure at 23° C. and 50% RH.

34. The multilayer coating according to claim 31, wherein said coating exhibits a ΔYI of less than 3 after 4 days of fluorescent light exposure at 23° C. and 50% RH.

35. The multilayer coating according to claim 21, wherein said hindered phenol group contains no tert-butyl group.

36. The multilayer coating according to claim 35, wherein said antioxidant has the following formula:

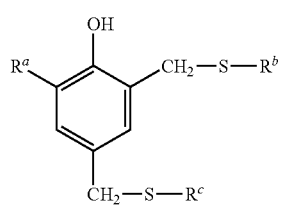

(3)

wherein $R^a$ is an alkyl group having 1-4 carbon atoms, and $R^b$ and $R^c$ are alkyl groups having 5-12 carbon atoms.

37. The multilayer coating according to claim 36, wherein said coating exhibits a YI of less than 7 after 4 days of fluorescent light exposure at 23° C. and 50% RH.

38. The multilayer coating according to claim 36, wherein said coating exhibits a ΔYI of less than 3 after 4 days of fluorescent light exposure at 23° C. and 50% RH.

39. The multilayer coating according to claim 36, wherein said antioxidant is 4,6-bis(octylthiomethyl)-o-cresol.

40. The multilayer coating of claim 1
wherein a first layer of said at least two adjacent layers comprises 0.3% of a first antioxidant with at least one hindered phenol group;
wherein a second layer of said at least two adjacent layers comprises 3% of a second antioxidant with at least one hindered phenol group; and
wherein said first antioxidant and said second antioxidant are the same.

41. The multilayer coating of claim 21
wherein a first layer of said at least two adjacent layers comprises 0.3% of a first antioxidant with at least one hindered phenol group;
wherein a second layer of said at least two adjacent layers comprises 3% of a second antioxidant with at least one hindered phenol group; and
wherein said first antioxidant and said second antioxidant are the same.

* * * * *